(12) United States Patent
Mehlhorn et al.

(10) Patent No.: US 8,354,809 B2
(45) Date of Patent: Jan. 15, 2013

(54) CONTROLLER FOR A MOTOR AND A METHOD OF CONTROLLING THE MOTOR

(75) Inventors: William L. Mehlhorn, Menomonee Falls, WI (US); Brian T. Branecky, Oconomowoc, WI (US)

(73) Assignee: Regal Beloit EPC Inc., Beloit, WI (US)

( * ) Notice: Subject to any disclaimer, the term of this patent is extended or adjusted under 35 U.S.C. 154(b) by 682 days.

(21) Appl. No.: 12/566,292

(22) Filed: Sep. 24, 2009

(65) Prior Publication Data

US 2010/0080714 A1 Apr. 1, 2010

Related U.S. Application Data

(60) Provisional application No. 61/101,769, filed on Oct. 1, 2008.

(51) Int. Cl.
*H02H 7/09* (2006.01)

(52) U.S. Cl. ............... 318/400.22; 318/430; 318/434; 318/471; 361/30; 361/32; 417/42

(58) Field of Classification Search .......... 318/430–434, 318/471–473, 798, 400.22; 417/42; 361/30–33
See application file for complete search history.

(56) References Cited

U.S. PATENT DOCUMENTS

| | | | |
|---|---|---|---|
| 1,061,919 A | 5/1913 | Miller | |
| 2,767,277 A | 10/1956 | Wirth | |
| 3,191,935 A | 6/1965 | Uecker | |
| 3,558,910 A | 1/1971 | Dale et al. | |
| 3,617,839 A | 11/1971 | Hill | |
| 3,781,925 A | 1/1974 | Curtis et al. | |
| 3,838,597 A | 10/1974 | Montgomery et al. | |
| 3,953,777 A | 4/1976 | McKee | |
| 3,963,375 A | 6/1976 | Curtis | |
| 4,021,700 A | 5/1977 | Ellis-Anwyl | |
| 4,168,413 A | 9/1979 | Halpine | |
| 4,185,187 A | 1/1980 | Rogers | |
| 4,319,712 A | 3/1982 | Bar | |
| 4,370,098 A | 1/1983 | McClain et al. | |
| 4,371,315 A | 2/1983 | Shikasho | |
| 4,420,787 A | 12/1983 | Tibbits et al. | |

(Continued)

FOREIGN PATENT DOCUMENTS

DE 2946049 5/1981

(Continued)

OTHER PUBLICATIONS

United States Patent Office Action for U.S. Appl. No. 11/549,499 dated Nov. 1, 2010 (16 pages).

(Continued)

*Primary Examiner* — Paul Ip
(74) *Attorney, Agent, or Firm* — Michael Best & Friedrich LLP

(57) ABSTRACT

A pump system. The pump system includes a pump, a motor coupled to the pump, a sensor coupled to a power source, and a controller. The motor operates the pump. The sensor detects an electrical characteristic of the power source. The controller executes a fault check, controls the motor, detects a change in the electrical characteristic, and suspends the execution of the fault check for a predetermined period of time when the detected change in the electrical characteristic is outside of a valid characteristic range.

30 Claims, 12 Drawing Sheets

U.S. PATENT DOCUMENTS

| | | |
|---|---|---|
| 4,428,434 A | 1/1984 | Gelaude |
| 4,449,260 A | 5/1984 | Whitaker |
| 4,473,338 A | 9/1984 | Garmong |
| 4,504,773 A | 3/1985 | Suzuki et al. |
| 4,505,643 A | 3/1985 | Millis et al. |
| 4,514,989 A | 5/1985 | Mount |
| 4,541,029 A | 9/1985 | Ohyama |
| 4,581,900 A | 4/1986 | Lowe et al. |
| 4,620,835 A | 11/1986 | Bell |
| 4,647,825 A | 3/1987 | Profio et al. |
| 4,676,914 A | 6/1987 | Mill et al. |
| 4,678,404 A | 7/1987 | Lorett et al. |
| 4,695,779 A | 9/1987 | Yates |
| 4,697,464 A | 10/1987 | Martin |
| 4,703,387 A | 10/1987 | Miller |
| 4,758,697 A | 7/1988 | Jeuneu |
| 4,781,525 A | 11/1988 | Hubbard et al. |
| 4,837,656 A | 6/1989 | Barnes |
| 4,839,571 A | 6/1989 | Farnham et al. |
| 4,841,404 A | 6/1989 | Marshall et al. |
| 4,864,287 A | 9/1989 | Kierstead |
| 4,885,655 A | 12/1989 | Springer et al. |
| 4,896,101 A | 1/1990 | Cobb |
| 4,907,610 A | 3/1990 | Meincke |
| 4,971,522 A | 11/1990 | Butlin |
| 4,996,646 A | 2/1991 | Farrington |
| 4,998,097 A | 3/1991 | Noth et al. |
| 5,079,784 A | 1/1992 | Rist et al. |
| 5,100,298 A | 3/1992 | Shibata et al. |
| RE33,874 E | 4/1992 | Miller |
| 5,167,041 A | 12/1992 | Burkitt, III |
| 5,172,089 A | 12/1992 | Wright et al. |
| 5,234,286 A | 8/1993 | Wagner |
| 5,255,148 A | 10/1993 | Yeh |
| 5,324,170 A | 6/1994 | Anastos et al. |
| 5,347,664 A | 9/1994 | Hamza et al. |
| 5,361,215 A | 11/1994 | Tompkins et al. |
| 5,422,014 A | 6/1995 | Allen et al. |
| 5,473,497 A | 12/1995 | Beatty |
| 5,545,012 A | 8/1996 | Anastos et al. |
| 5,548,854 A | 8/1996 | Bloemer et al. |
| 5,550,753 A | 8/1996 | Tompkins et al. |
| 5,559,720 A | 9/1996 | Tompkins et al. |
| 5,570,481 A | 11/1996 | Mathis et al. |
| 5,574,346 A * | 11/1996 | Chavan et al. ............ 318/434 |
| 5,577,890 A | 11/1996 | Nielsen et al. |
| 5,601,413 A | 2/1997 | Langley et al. |
| 5,624,237 A | 4/1997 | Prescott et al. |
| 5,632,468 A | 5/1997 | Schoenmeyr |
| 5,633,540 A | 5/1997 | Moan |
| 5,690,476 A | 11/1997 | Miller |
| 5,727,933 A | 3/1998 | Laskaris et al. |
| 5,777,833 A | 7/1998 | Romillon |
| 5,820,350 A | 10/1998 | Mantey et al. |
| 5,833,437 A | 11/1998 | Kurth et al. |
| 5,907,281 A | 5/1999 | Miller, Jr. et al. |
| 5,930,092 A | 7/1999 | Nystrom |
| 5,947,700 A | 9/1999 | McKain et al. |
| 5,959,534 A | 9/1999 | Campbell et al. |
| 5,977,732 A | 11/1999 | Matsumoto |
| 6,043,461 A | 3/2000 | Holling et al. |
| 6,045,333 A | 4/2000 | Breit |
| 6,059,536 A | 5/2000 | Stingl |
| 6,092,992 A * | 7/2000 | Imblum et al. ............ 417/42 |
| 6,137,418 A * | 10/2000 | Zuercher et al. ............ 340/648 |
| 6,157,304 A | 12/2000 | Bennett et al. |
| 6,171,073 B1 | 1/2001 | McKain et al. |
| 6,199,224 B1 | 3/2001 | Versland |
| 6,213,724 B1 | 4/2001 | Haugen et al. |
| 6,216,814 B1 | 4/2001 | Fujita et al. |
| 6,227,808 B1 | 5/2001 | McDonough |
| 6,238,188 B1 | 5/2001 | Lifson |
| 6,247,429 B1 | 6/2001 | Hara et al. |
| 6,253,227 B1 | 6/2001 | Tompkins et al. |
| 6,342,841 B1 | 1/2002 | Stingl |
| 6,354,805 B1 | 3/2002 | Moller |
| 6,364,621 B1 | 4/2002 | Yamauchi |
| 6,390,781 B1 | 5/2002 | McDonough |
| 6,468,042 B2 | 10/2002 | Moller |
| 6,468,052 B2 | 10/2002 | McKain et al. |
| 6,481,973 B1 | 11/2002 | Struthers |
| 6,501,240 B2 | 12/2002 | Ueda et al. |
| 6,501,629 B1 | 12/2002 | Marriott |
| 6,504,338 B1 | 1/2003 | Eichorn |
| 6,522,034 B1 | 2/2003 | Nakayama |
| 6,534,940 B2 | 3/2003 | Bell et al. |
| 6,534,947 B2 | 3/2003 | Johnson et al. |
| 6,543,940 B2 | 4/2003 | Chu |
| 6,590,188 B2 | 7/2003 | Cline et al. |
| 6,595,762 B2 | 7/2003 | Khanwilkar et al. |
| 6,616,413 B2 | 9/2003 | Humpheries |
| 6,623,245 B2 | 9/2003 | Meza et al. |
| 6,625,519 B2 | 9/2003 | Goodwin et al. |
| 6,636,135 B1 | 10/2003 | Vetter |
| 6,638,023 B2 | 10/2003 | Scott |
| 6,676,831 B2 | 1/2004 | Wolfe |
| 6,696,676 B1 | 2/2004 | Graves et al. |
| 6,709,240 B1 | 3/2004 | Schmalz et al. |
| 6,715,996 B2 | 4/2004 | Moeller |
| 6,732,387 B1 | 5/2004 | Waldron |
| 6,768,279 B1 | 7/2004 | Skinner et al. |
| 6,806,677 B2 | 10/2004 | Kelly et al. |
| 6,832,898 B2 | 12/2004 | Yoshida et al. |
| 6,875,961 B1 | 4/2005 | Collins |
| 6,895,608 B2 | 5/2005 | Goettl |
| 6,906,482 B2 | 6/2005 | Shimizu et al. |
| 6,933,693 B2 | 8/2005 | Schuchmann |
| 6,941,785 B2 | 9/2005 | Haynes et al. |
| 6,965,815 B1 | 11/2005 | Tompkins et al. |
| 6,976,052 B2 | 12/2005 | Tompkins et al. |
| 7,055,189 B2 | 6/2006 | Goettl |
| 7,089,606 B2 | 8/2006 | Goettl |
| 7,117,120 B2 | 10/2006 | Beck et al. |
| 7,142,125 B2 | 11/2006 | Larson et al. |
| 7,163,380 B2 | 1/2007 | Jones |
| 7,213,275 B2 | 5/2007 | Goettl |
| 7,327,275 B2 | 2/2008 | Brochu et al. |
| 7,417,834 B2 | 8/2008 | Cline et al. |
| 7,437,215 B2 | 10/2008 | Anderson et al. |
| 8,133,034 B2 | 3/2012 | Mehlhorn et al. |
| 2001/0029407 A1 | 10/2001 | Tompkins et al. |
| 2002/0175828 A1 | 11/2002 | Macey |
| 2002/0176783 A1 | 11/2002 | Moeller |
| 2002/0190687 A1 | 12/2002 | Bell et al. |
| 2003/0106147 A1 | 6/2003 | Cohen et al. |
| 2004/0009075 A1 | 1/2004 | Meza et al. |
| 2004/0062658 A1 | 4/2004 | Beck et al. |
| 2004/0064292 A1 | 4/2004 | Beck et al. |
| 2004/0205886 A1 | 10/2004 | Goettl |
| 2004/0213676 A1 | 10/2004 | Phillips et al. |
| 2005/0097665 A1 | 5/2005 | Goettl |
| 2005/0123408 A1 | 6/2005 | Koehl |
| 2005/0133088 A1 | 6/2005 | Bologeorges |
| 2005/0158177 A1 | 7/2005 | Mehlhorn |
| 2005/0193485 A1 | 9/2005 | Wolfe |
| 2005/0226731 A1 | 10/2005 | Mehlhorn et al. |
| 2005/0281681 A1 | 12/2005 | Anderson et al. |
| 2006/0045750 A1 | 3/2006 | Stiles |
| 2006/0090255 A1 | 5/2006 | Cohen |
| 2006/0101571 A1 | 5/2006 | Goettl |
| 2006/0107453 A1 | 5/2006 | Goettl |
| 2006/0127227 A1 | 6/2006 | Mehlhorn et al. |
| 2006/0146462 A1 | 7/2006 | McMillian, IV |
| 2006/0220604 A1 | 10/2006 | Hirai |
| 2006/0238931 A1 | 10/2006 | Cline et al. |
| 2006/0242757 A1 | 11/2006 | Goettl |
| 2007/0056955 A1 | 3/2007 | Maddox |
| 2007/0056956 A1 | 3/2007 | Maddox |
| 2007/0058313 A1 | 3/2007 | Maddox |
| 2007/0058314 A1 | 3/2007 | Maddox |
| 2007/0058315 A1 | 3/2007 | Maddox |
| 2007/0061051 A1 | 3/2007 | Maddox |
| 2007/0114162 A1 | 5/2007 | Stiles, Jr. et al. |
| 2007/0154319 A1 | 7/2007 | Stiles, Jr. et al. |
| 2007/0154320 A1 | 7/2007 | Stiles, Jr. et al. |
| 2007/0154321 A1 | 7/2007 | Stiles, Jr. et al. |
| 2007/0154322 A1 | 7/2007 | Stiles, Jr. et al. |

| | | | |
|---|---|---|---|
| 2007/0154323 | A1 | 7/2007 | Stiles, Jr. et al. |
| 2007/0158274 | A1 | 7/2007 | King |
| 2007/0160480 | A1 | 7/2007 | Ruffo |
| 2007/0163929 | A1 | 7/2007 | Stiles, Jr. et al. |
| 2007/0177985 | A1 | 8/2007 | Walls et al. |
| 2007/0183902 | A1 | 8/2007 | Stiles, Jr. et al. |
| 2007/0233509 | A1 | 10/2007 | Buchman et al. |
| 2007/0258827 | A1 | 11/2007 | Gierke |
| 2007/0286737 | A1 | 12/2007 | Johnson |
| 2008/0003114 | A1 | 1/2008 | Levin et al. |
| 2008/0041839 | A1 | 2/2008 | Tran |
| 2008/0063535 | A1 | 3/2008 | Koehl |
| 2008/0095638 | A1 | 4/2008 | Branecky |
| 2008/0095639 | A1 | 4/2008 | Bartos et al. |
| 2008/0095640 | A1 | 4/2008 | Branecky et al. |
| 2008/0112817 | A1 | 5/2008 | Sylvester |
| 2008/0168599 | A1 | 7/2008 | Caudill et al. |
| 2008/0181789 | A1 | 7/2008 | Koehl |
| 2009/0035151 | A1 | 2/2009 | Sugiura et al. |
| 2009/0067102 | A1 | 3/2009 | Cline et al. |
| 2009/0280014 | A1 | 11/2009 | Branecky |
| 2009/0288407 | A1 | 11/2009 | Bartos et al. |
| 2009/0290989 | A1 | 11/2009 | Mehlhorn |
| 2009/0290990 | A1 | 11/2009 | Branecky |
| 2009/0290991 | A1 | 11/2009 | Mehlhorn |
| 2010/0068073 | A1 | 3/2010 | Branecky |
| 2010/0194329 | A1* | 8/2010 | Lu et al. .................. 318/798 |
| 2010/0232981 | A1 | 9/2010 | Branecky |
| 2011/0002792 | A1 | 1/2011 | Bartos |
| 2011/0080676 | A1* | 4/2011 | Yoshida et al. ............. 361/30 |

FOREIGN PATENT DOCUMENTS

| | | |
|---|---|---|
| DE | 19736079 | 2/1999 |
| EP | 0150068 | 7/1985 |
| EP | 0226858 | 7/1987 |
| EP | 0246769 | 11/1987 |
| EP | 0833436 | 4/1998 |
| EP | 1585205 | 10/2005 |
| GB | 2352533 | 1/2001 |
| JP | 55-72678 | 5/1980 |
| WO | 2005/111473 | 11/2005 |
| WO | 2010/039580 | 4/2010 |

OTHER PUBLICATIONS

European Patent Office Action for Application No. 07118126.7 dated Dec. 20, 2010 (7 pages).
United States Patent Office Action for U.S. Appl. No. 11/549,499 dated Jan. 19, 2011 (16 pages).
United States Patent Office Action for U.S. Appl. No. 11/549,518 dated Oct. 27, 2010 (12 pages).
United States Patent Office Action for U.S. Appl. No. 11/549,518 dated Feb. 2, 2011 (10 pages).
United States Patent Office Action for U.S. Appl. No. 12/506,372 dated Feb. 3, 2011 (9 pages).
United States Patent Office Notice of Allowance for U.S. Appl. No. 11/549,499 dated Aug. 26, 2011 (17 pages).
United States Patent Office Notice of Allowance for U.S. Appl. No. 12/506,372 dated Jan. 30, 2012 (6 pages).
United States Patent Office Action for U.S. Appl. No. 12/751,275 dated Feb. 1, 2012 (11 pages).
International Search Report and Written Opinion for Application No. PCT/US09/58232 dated Nov. 17, 2009 (7 pages).
European Patent Office Action for Application No. 07118064.0 dated Apr. 27, 2010 (3 pages).
United States Patent Office Action for U.S. Appl. No. 11/549,499 dated Apr. 23, 2010 (14 pages).
United States Patent Office Action for U.S. Appl. No. 11/549,518 dated Apr. 9, 2010 (12 pages).
United States Patent Office Action for U.S. Appl. No. 11/549,499 dated Apr. 27, 2012 (18 pages).
European Patent Office Action for Application No. 07118126.7 dated Sep. 21, 2011 (5 pages).
United States Patent Office Action for U.S. Appl. No. 11/549,518 dated Nov. 18, 2011 (23 pages).
United States Patent Office Notice of Allowance for U.S. Appl. No. 12/506,372 dated Nov. 29, 2011 (7 pages).
United States Patent Office Action for U.S. Appl. No. 12/506,417 dated Dec. 14, 2011 (11 pages).
United States Patent Office Action for U.S. Appl. No. 12/506,362 dated Dec. 13, 2011 (7 pages).
PCT/US09/58232 International Search Report, 2 pages, dated Nov. 17, 2009.
Office Action from U.S. Patent Office for U.S. Appl. No. 11/549,499 dated Apr. 1, 2009 (13 pages).
Office Action from U.S. Patent Office for U.S. Appl. No. 11/549,499 dated Nov. 12, 2009 (14 pages).
European Patent Office Examination Report for Application No. 07118064.0 dated Sep. 22, 2008 (7 pages).
Sta-Rite Industries, Inc., 60 Cycle "C" and "CC" Series Centrifugal Pumps for Swimming Pool Use, Owner's Manual, S408, Printed in U.S.A., 16 pages, 2002.
European Patent Office Search Report for Application No. 05252215.8 dated Oct. 30, 2008 (3 pages).
Office Action from U.S. Patent Office for U.S. Appl. No. 11/549,518 dated Apr. 2, 2009 (9 pages).
Office Action from U.S. Patent Office for U.S. Appl. No. 11/549,518 dated Dec. 4, 2009 (9 pages).
EP07118064.0 extended European Search Report, 11 pages, dated Feb. 28, 2008.
Fail-Safe, LLC, Save Lives! Use Fail-Safe Suction-Safe Pool & Spa Pumps, Brochure, 2000.
Fail-Safe, LLC, Suction-Safe Pool & Spa Pump—Installation, Operation and Service, Operator's Manual, 2003.
Office Action from U.S. Patent Office for U.S. Appl. No. 11/549,537 dated Feb. 9, 2009 (22 pages).
Office Action from U.S. Patent Office for U.S. Appl. No. 11/549,537 dated Aug. 3, 2009 (21 pages).
Notice of Allowance from United States Patent Office for U.S. Appl. No. 11/549,537 dated Dec. 15, 2009 (5 pages).
United States Patent Office Action for U.S. Appl. No. 11/549,518 dated Aug. 4, 2011 (11 pages).
United States Patent Office Action for U.S. Appl. No. 12/506,372 dated Aug. 8, 2011 (14 pages).
Joe Cohen; signed letter to Sheldon L. Wolfe; 1 page.
Sta-Rite Industries, Inc.; Facsimile; 1 page.
Fail-Safe, LLC and Sta-Rite Industries, Inc.; Non-Disclosure Agreement; 2 pages.
Author unknown; Safety Vacuum Release Valve from Fail Safe; 1 page.
Author unknown; Request for Lab Project; 3 pages.
Joe Cohen; signed letter to Gary Brooks; 1 page.
Author unknown; "Suction Safe" Swimming Pool Pump: *Simulated Field-test*; 3 pages.
Author unknown; General Worksheet: Fail-Safe Vacuum Release Valve W/ Franklin 2.6 hp "Load Tech" motor on Vinyl Liner Pool; 3 pages.
Richard Meyer; Orifices for Fail-Safe assembly, 1 page.
European Patent Office Action for Application No. 07118126.7 dated Jul. 12, 2012 (5 pages).
United States Patent Office Action for U.S. Appl. No. 12/506,362 dated Jul. 3, 2012 (9 pages).
United States Patent Office Action for U.S. Appl. No. 12/853,643 dated Jun. 12, 2012 (27 pages).
United States Patent Office Action for U.S. Appl. No. 11/549,518 dated Jun. 25, 2012 (21 pages).
United States Patent Office Action for U.S. Appl. No. 12/506,417 dated Jul. 20, 2012 (10 pages).
United States Patent Office Notice of Allowance for U.S. Appl. No. 12/751,275 dated Sep. 5, 2012 (10 pages).

* cited by examiner

US 8,354,809 B2

CONTROLLER FOR A MOTOR AND A METHOD OF CONTROLLING THE MOTOR

RELATED APPLICATION

The present patent application claims the benefit of prior filed co-pending U.S. Provisional Patent Application No. 61/101,769; filed on Oct. 1, 2008; the entire content of which is hereby incorporated by reference.

BACKGROUND

The invention relates to a controller for a motor, and particularly, a controller for a motor operating a pump.

Occasionally on a swimming pool, spa, or similar jetted-fluid application, the main drain can become obstructed with an object, such as a towel or pool toy. When this happens, the suction force of the pump is applied to the obstruction and the object sticks to the drain. This is called suction entrapment. If the object substantially covers the drain (such as a towel covering the drain), water is pumped out of the drain side of the pump. Eventually the pump runs dry, the seals burn out, and the pump can be damaged. Alternatively, the object itself can become damaged when stuck to the drain.

Another type of entrapment is referred to as mechanical entrapment. Mechanical entrapment occurs when an object, such as a towel or pool toy, gets tangled in the drain cover. Mechanical entrapment may also effect the operation of the pump.

Several solutions have been proposed for suction and mechanical entrapment. For example, new pool construction is required to have two drains, so that if one drain becomes plugged, the other can still flow freely and no vacuum entrapment can take place. This does not help existing pools, however, as adding a second drain to an in-ground, one-drain pool is very difficult and expensive. Modern pool drain covers are also designed such that items cannot become entwined with the cover.

As another example, several manufacturers offer systems known as Safety Vacuum Release Systems (SVRS). SVRS often contain several layers of protection to help prevent both mechanical and suction entrapment. Most SVRS use hydraulic release valves that are plumbed into the suction side of the pump. The valve is designed to release (open to the atmosphere) if the vacuum (or pressure) inside the drain pipe exceeds a set threshold, thus releasing the obstruction. These valves can be very effective at releasing the suction developed under these circumstances. Unfortunately, they have several technical problems that have limited their use.

SUMMARY

In one embodiment, the invention provides a pump system. The pump system includes a pump, a motor coupled to the pump, a sensor coupled to a power source, and a controller. The motor operates the pump. The sensor detects an electrical characteristic of the power source. The controller executes a fault check, controls the motor, detects a change in the electrical characteristic, and suspends the execution of the fault check for a predetermined period of time when the detected change in the electrical characteristic is outside of a valid characteristic range.

In another embodiment, the invention provides a method of operating a pump system including a pump, a motor, a sensor, and a controller. The method includes the acts of operating the motor, executing a fault check, sensing an electrical characteristic related to a power supplied by a power source coupled to the motor, determining that the electrical characteristic is outside of a valid characteristic range, and suspending execution of the fault check for a predetermined period of time after determining the electrical characteristic is outside the valid characteristic range.

In another embodiment, the invention provides a controller for a motor. The controller includes a memory, a sensor, and a processor. The sensor is configured to sense an electrical characteristic of the motor. The processor is coupled to the memory and the sensor, and executes a fault check, controls the motor, detects a change in the sensed electrical characteristic, and suspends the executing of the fault check when the detected change in the electrical characteristic is outside of a valid characteristic range.

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Co-pending U.S. patent application Ser. Nos. 11/549,499 and 11/549,537, filed Oct. 13, 2006, the contents of which are hereby incorporated by reference, describe systems and methods for detecting possible suction and/or mechanical entrapment events. The present application discloses improvements to the systems and methods described in the above applications.

Figure 1:
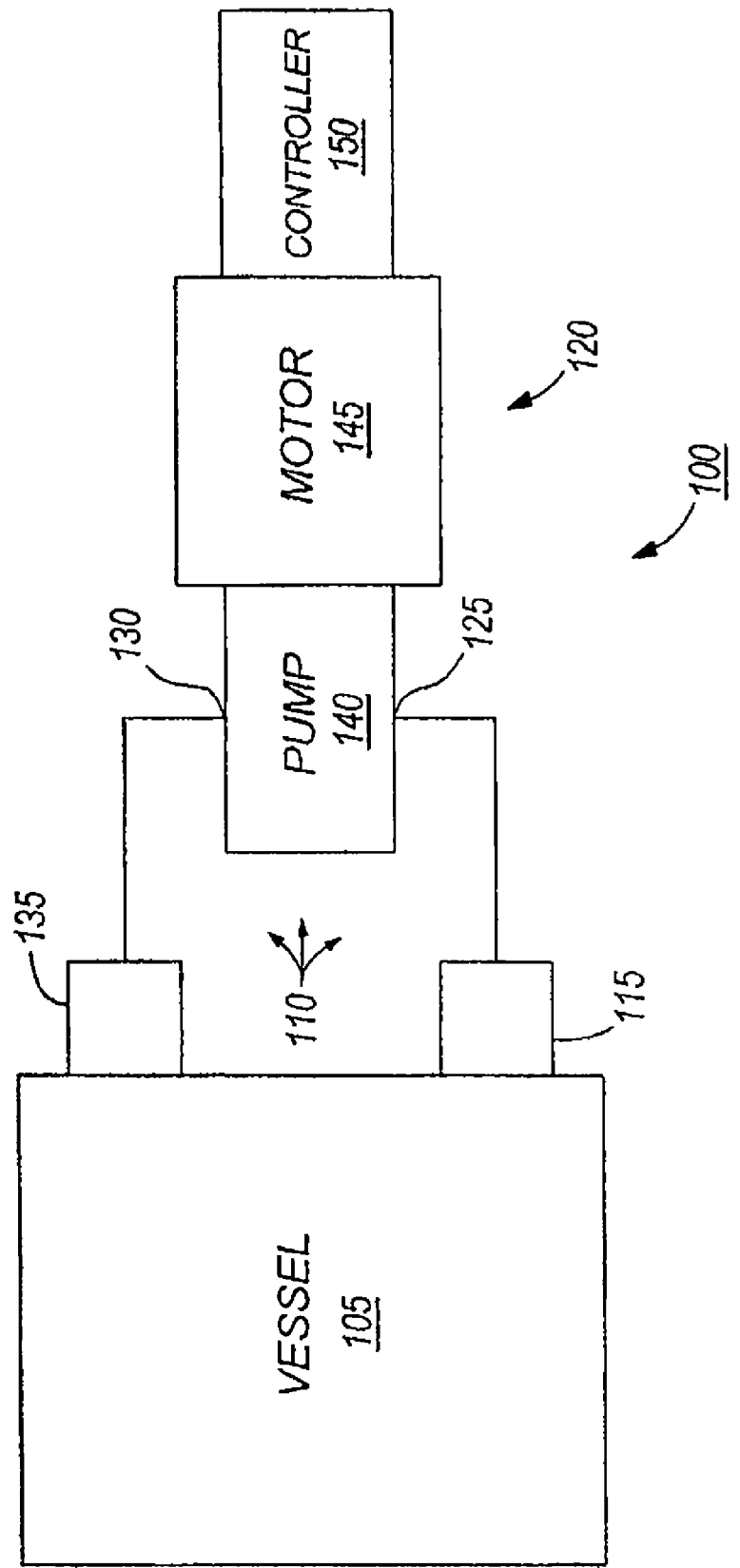
FIG. 1 is a schematic representation of a jetted-spa incorporating the invention.

FIG. 1 schematically represents a jetted-spa 100 incorporating the invention. However, the invention is not limited to the jetted-spa 100 and can be used in other jetted-fluid systems (e.g., pools, whirlpools, jetted-tubs, etc.). It is also envisioned that the invention can be used in other applications (e.g., fluid-pumping applications).

As shown in FIG. 1, the spa 100 includes a vessel 105. As used herein, the vessel 105 is a hollow container such as a tub, pool, tank, or vat that holds a load. The load includes a fluid, such as chlorinated water, and may include one or more occupants or items. The spa further includes a fluid-movement system 110 coupled to the vessel 105. The fluid-movement system 110 includes a drain 115, a pumping apparatus 120 having an inlet 125 coupled to the drain and an outlet 130, and a return 135 coupled to the outlet 130 of the pumping apparatus 120. The pumping apparatus 120 includes a pump 140, a motor 145 coupled to the pump 140, and a controller 150 for controlling the motor 145. For the constructions described herein, the pump 140 is a centrifugal pump and the motor 145 is an induction motor (e.g., capacitor-start, capacitor-run induction motor; split-phase induction motor; three-phase induction motor; etc.). However, the invention is not limited to this type of pump or motor. For example, a brushless, direct current (DC) motor or a vector-driven motor may be used in a different pumping application. For other constructions, a jetted-fluid system can include multiple drains, multiple returns, or even multiple fluid movement systems.

Referring back to FIG. 1, the vessel 105 holds a fluid. When the fluid movement system 110 is active, the pump 140 causes the fluid to move from the vessel 105, through the drain 115 and the pump 140, and jet, into the vessel 105. This pumping operation occurs when the controller 150 controllably provides a power to the motor 145, resulting in a mechanical movement by the motor 145. The coupling of the motor 145 (e.g., a direct coupling or an indirect coupling via a linkage system) to the pump 140 results in the motor 145 mechanically operating the pump 140 to move the fluid. The operation of the controller 150 can be via an operator interface, which may be as simple as an ON switch.

Figure 2:
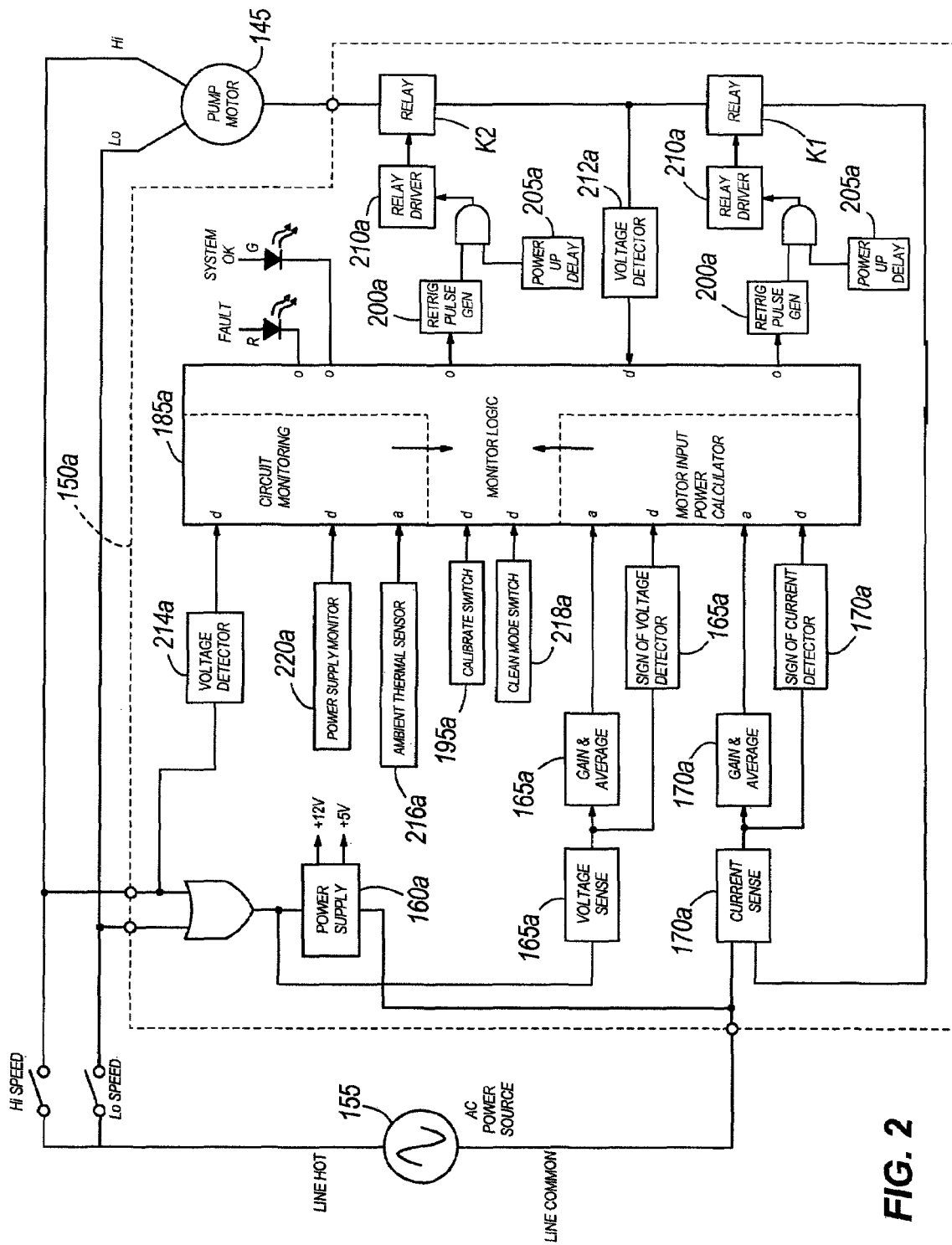
FIG. 2 is a block diagram of a first controller capable of being used in the jetted-spa shown in FIG. 1.
Figure 3A:
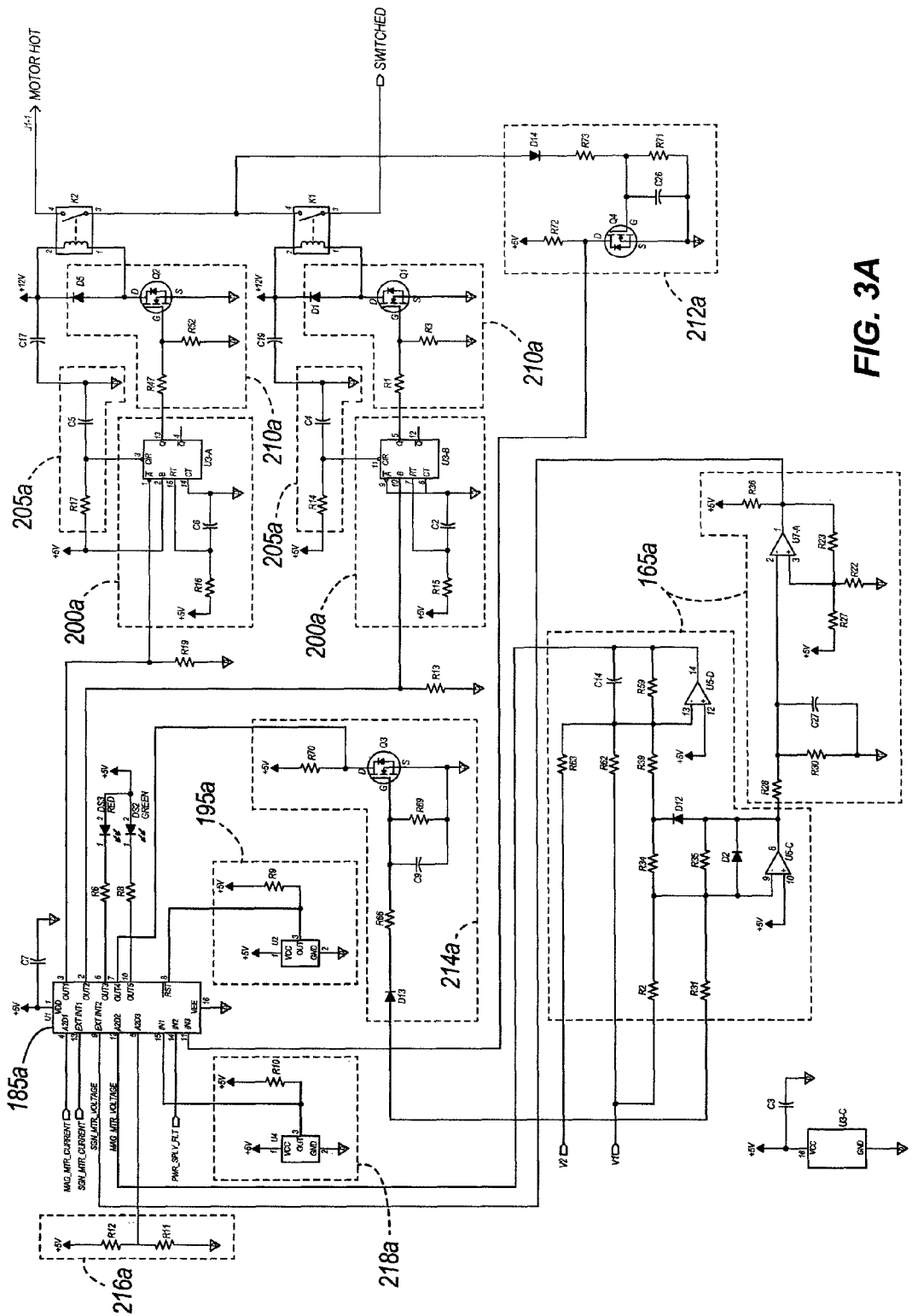
FIGS. 3A and 3B are electrical schematics of the first controller shown in FIG. 2.
Figure 3B:
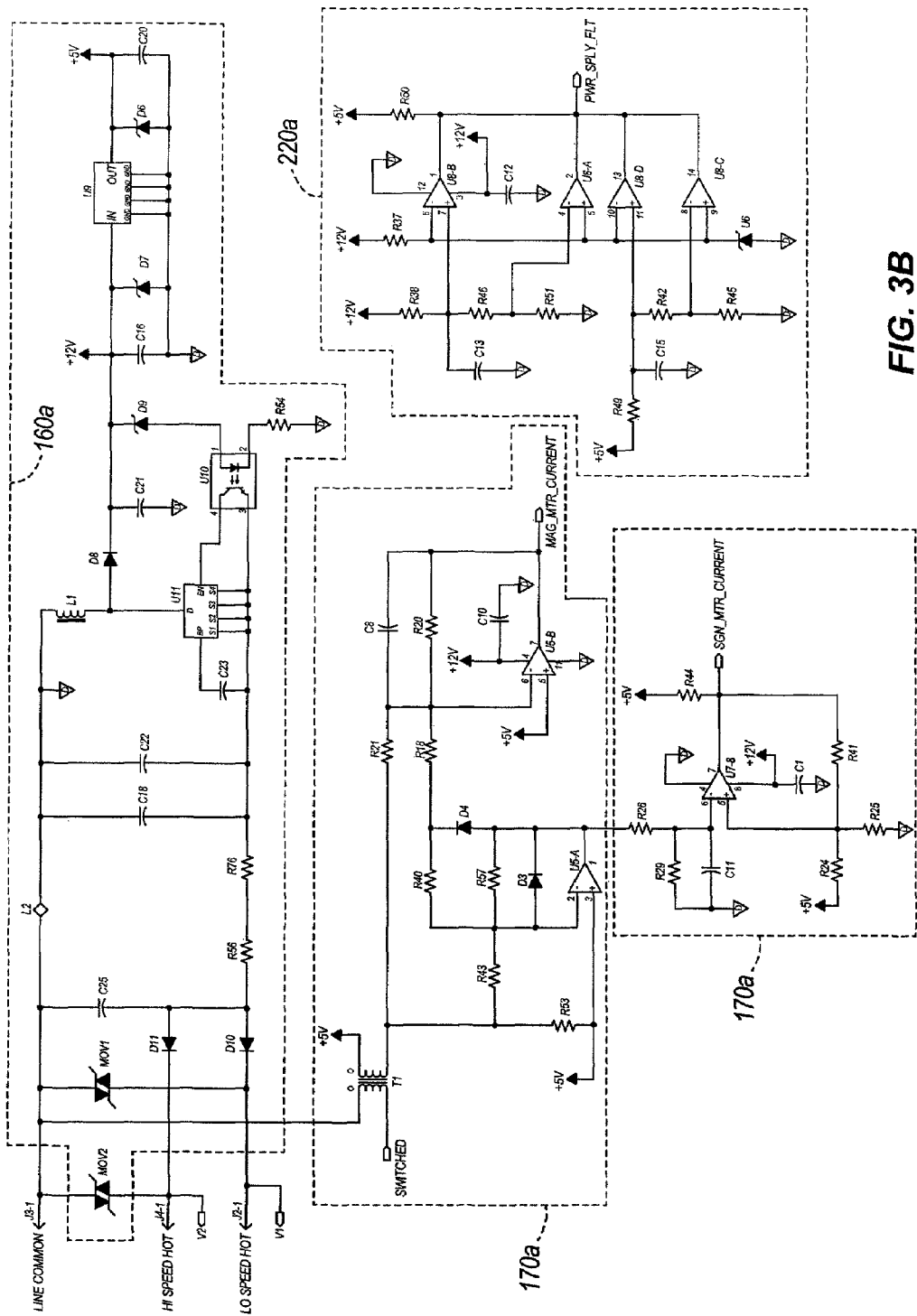

FIG. 2 is a block diagram of a second construction of the controller 150a, and FIGS. 3A and 3B are an electrical schematic of the controller 150a. As shown in FIG. 2, the controller 150a is electrically connected to a power source 155 and the motor 145.

With reference to FIG. 2 and FIG. 3B, the controller 150a includes a power supply 160a. The power supply 160a includes resistors R54, R56 and R76; capacitors C16, C18, C20, C21, C22, C23 and C25; diodes D8, D10 and D11; zener diodes D6, D7 and D9; power supply controller U11; regulator U9; inductors L1 and L2, surge suppressors MOV1 and MOV2, and optical switch U10. The power supply 160a receives power from a power source 155 and provides the proper DC voltage (e.g., +5 VDC and +12 VDC) for operating the controller 150a.

For the controller 150a shown in FIG. 2, FIG. 3A, and FIG. 3B, the controller 150a monitors motor input or supply power to determine if a drain obstruction has taken place. If the drain 115 or plumbing is plugged on the suction side of the pump 140, the pump 140 will no longer be pumping water, and input power to the motor 145 drops. If this condition occurs, the controller 150a declares a fault, the motor 145 powers down, and a fault indicator lights.

A voltage sense and average circuit 165a, a current sense and average circuit 170a, and a microcontroller 185a perform the monitoring of the input power. One example voltage sense and average circuit 165a is shown in FIG. 3A. The voltage sense and average circuit 165a includes resistors R2, R31, R34, R35, R39, R59, R62, and R63; diodes D2 and D12; capacitor C14; and operational amplifiers U5C and U5D. The voltage sense and average circuit 165a rectifies the voltage from the power source 155 and then performs a DC average of the rectified voltage. The DC average is then fed to the microcontroller 185a. The voltage sense and average circuit 165a further includes resistors R22, R23, R27, R28, R30, and R36; capacitor C27; and comparator U7A; which provide the sign of the voltage waveform (i.e., acts as a zero-crossing detector) to the microcontroller 185a.

One example current sense and average circuit 170a is shown in FIG. 3B. The current sense and average circuit 170a includes transformer T1 and resistor R53, which act as a current sensor that senses the current applied to the motor 145. The current sense and average circuit 170a also includes resistors R18, R20, R21, R40, R43, and R57; diodes D3 and D4; capacitor C8; and operational amplifiers U5A and U5B, which rectify and average the value representing the sensed current. For example, the resultant scaling of the current sense and average circuit 170a can be a positive five to zero volt value corresponding to a zero to twenty-five amp RMS value. The resulting DC average is then fed to the microcontroller 185a. The current sense and average circuit 170a further includes resistors R24, R25, R26, R29, R41, and R44; capacitor C11; and comparator U7B; which provide the sign of the current waveform (i.e., acts as a zero-crossing detector) to microcontroller 185a.

One example microcontroller 185a that can be used with the invention is a Motorola brand microcontroller, model no. MC68HC908QY4CP. The microcontroller 185a includes a processor and a memory. The memory includes software instructions that are read, interpreted, and executed by the processor to manipulate data or signals. The memory also includes data storage memory. The microcontroller 185a can include other circuitry (e.g., an analog-to-digital converter) necessary for operating the microcontroller 185a and/or can perform the function of some of the other circuitry described above for the controller 150a. In general, the microcontroller 185a receives inputs (signals or data), executes software instructions to analyze the inputs, and generates outputs (signals or data) based on the analyses. Although the microcontroller 185a is shown and described, the functions of the microcontroller 185a can be implemented with other devices, including a variety of integrated circuits (e.g., an application-specific-integrated circuit), programmable devices, and/or discrete devices, as would be apparent to one of ordinary skill in the art. Additionally, it is envisioned that the microcontroller 185a or similar circuitry can be distributed among multiple microcontrollers 185a or similar circuitry. It is also envisioned that the microcontroller 185a or similar circuitry can perform the function of some of the other circuitry described (e.g., circuitry 165a-180a) above for the controller 150a. For example, the microcontroller 185a, in some constructions, can receive a sensed voltage and/or sensed current and determine an averaged voltage, an averaged current, the zero-crossings of the sensed voltage, and/or the zero crossings of the sensed current.

The microcontroller 185a receives the signals representing the average voltage applied to the motor 145, the average current through the motor 145, the zero crossings of the motor voltage, and the zero crossings of the motor current. Based on the zero crossings, the microcontroller 185a can determine a power factor and a power. The power factor can be calculated using known mathematical equations or by using a lookup table based on the mathematical equations. The microcontroller 185a can then calculate a power with the averaged voltage, the averaged current, and the power factor as is known. The microcontroller 185a can then compare the calculated power with a power calibration value to determine whether a fault condition (e.g., due to an obstruction) is present.

The calibrating of the controller 150a occurs when the user activates a calibrate switch 195a. One example calibrate switch 195a is shown in FIG. 3A. Of course, other calibrate switches are possible. In one method of operation for the calibrate switch 195a, a calibration fob needs to be held near the switch 195a when the controller 150a receives an initial power. After removing the magnet and cycling power, the controller 150a goes through priming and enters an automatic calibration mode (discussed below).

The controller 150a controllably provides power to the motor 145. With references to FIGS. 2 and 3A, the controller 150a includes a retriggerable pulse generator circuit 200a. The retriggerable pulse generator circuit 200a includes resistors R15 and R16, capacitors C2 and C6, and pulse generators U3A and U3B, and outputs a value to the relay driver circuit 210a if the retriggerable pulse generator circuit 200a receives a signal having a pulse frequency greater than a set frequency determined by resistors R15 and R16, and capacitors C2 and C6. The retriggerable pulse generators U3A and U3B also receive a signal from power-up delay circuit 205a, which prevents nuisance triggering of the relays on startup. The relay driver circuits 210a shown in FIG. 3A include resistors R1, R3, R47, and R52; diodes D1 and D5; and switches Q1 and Q2. The relay driver circuits 210a control relays K1 and K2. In order for current to flow to the motor, both relays K1 and K2 need to "close".

Figure 4:
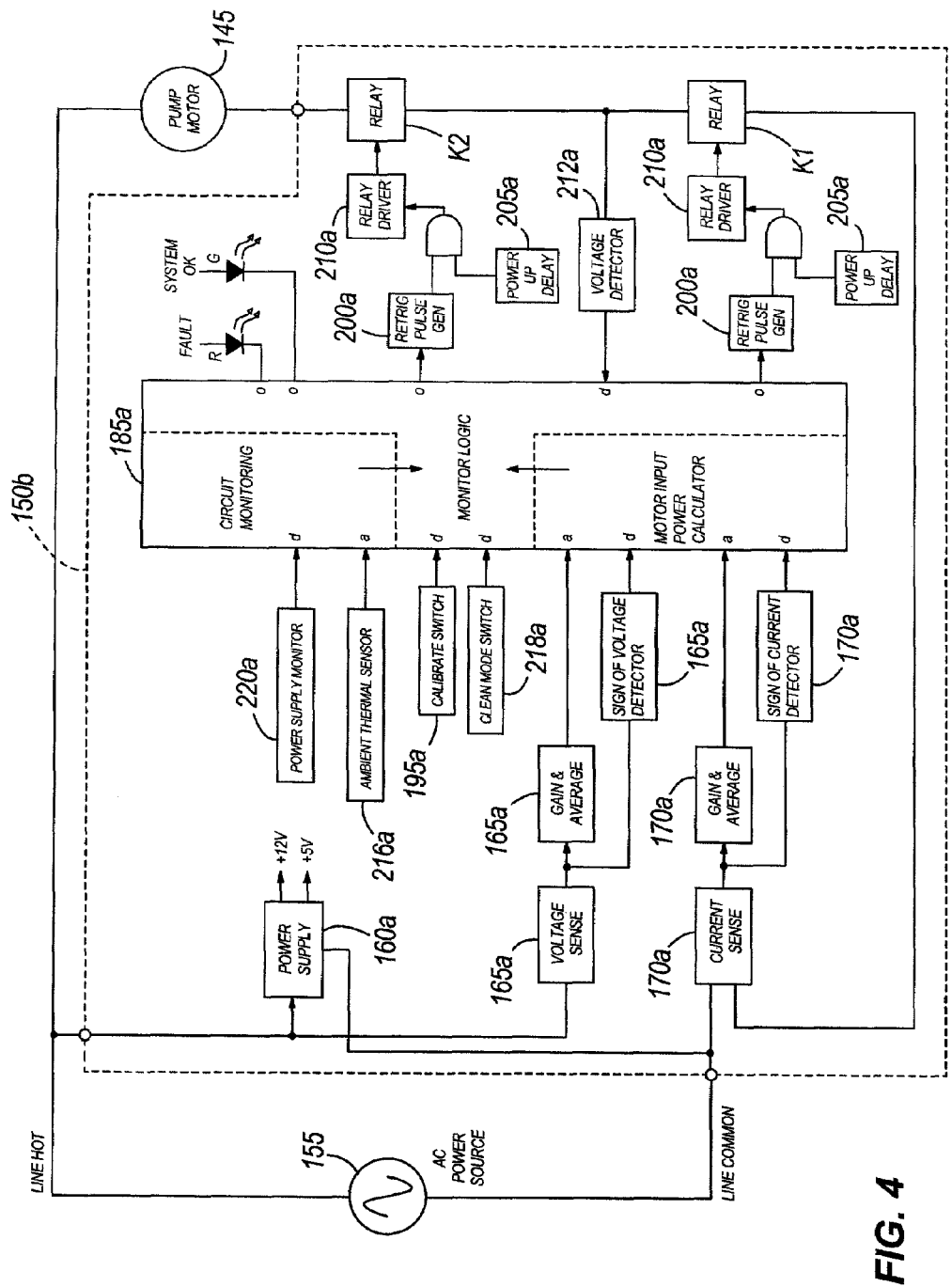
FIG. 4 is a block diagram of a second controller capable of being used in the jetted-spa shown in FIG. 1.

The controller 150a further includes two voltage detectors 212a and 214a. The first voltage detector 212a includes resistors R71, R72, and R73; capacitor C26; diode D14; and switch Q4. The first voltage detector 212a detects when voltage is present across relay K1, and verifies that the relays are functioning properly before allowing the motor to be energized. The second voltage detector 214a includes resistors R66, R69, and R70; capacitor C9; diode D13; and switch Q3. The second voltage detector 214a senses if a two speed motor is being operated in high or low speed mode. The motor input power trip values are set according to what speed the motor is being operated. It is also envisioned that the controller 150a can be used with a single speed motor without the second voltage detector 214a (e.g., controller 150b is shown in FIG. 4).

The controller 150a also includes an ambient thermal sensor circuit 216a for monitoring the operating temperature of the controller 150a, a power supply monitor 220a for monitoring the voltages produced by the power supply 160a, and a plurality of LEDs DS1 and DS3 for providing information to the user. In the construction shown, a green LED DS2 indicates power is applied to the controller 150a, and a red LED DS3 indicates a fault has occurred. Of course, other interfaces can be used for providing information to the operator.

The controller 150a further includes a clean mode switch 218a, which includes switch U4 and resistor R10. The clean mode switch can be actuated by an operator (e.g., a maintenance person) to deactivate the power monitoring function described herein for a time period (e.g., 30 minutes so that maintenance person can clean the vessel 105). Moreover, the red LED DS3 can be used to indicate that controller 150a is in a clean mode. After the time period, the controller 150a returns to normal operation. In some constructions, the maintenance person can actuate the clean mode switch 218a for the controller 150a to exit the clean mode before the time period is completed.

In some cases, it may be desirable to deactivate the power monitoring function for reasons other than performing cleaning operations on the vessel 105. Such cases may be referred as "deactivate mode", "disabled mode", "unprotected mode", or the like. Regardless of the name, this later mode of operation can be at least partially characterized by the instructions defined under the clean mode operation above. Moreover, when referring to the clean mode and its operation herein, the discussion also applies to these later modes for deactivating the power monitoring function and vice versa.

The following describes the normal sequence of events for one method of operation of the controller 150a. When the fluid movement system 110 is initially activated, the system 110 may have to prime the suction side plumbing and get the fluid flowing smoothly (referred to as "the normal running period"). It is during the normal running period that the circuit is most effective at detecting an abnormal event.

Upon a system power-up, the system 110 can enter a priming period. The priming period can be preset for a time duration (e.g., a time duration of 3 minutes), or for a time duration determined by a sensed condition. After the priming period, the system 110 enters the normal running period. The controller 150a can include instructions to perform an automatic calibration to determine one or more calibration values after a first system power-up. One example calibration value is a power calibration value. In some cases, the power calibration value is an average of monitored power values over a predetermined period of time. The power calibration value is stored in the memory of the microcontroller 185a, and will be used as the basis for monitoring the vessel 105.

If for some reason the operating conditions of the vessel 105 change, the controller 150a can be re-calibrated by the operator. In some constructions, the operator actuates the calibrate switch 195a to erase the existing one or more calibration values stored in the memory of the microcontroller 185a. The operator then powers down the system 110, particularly the motor 145, and performs a system power-up. The system 110 starts the automatic calibration process as discussed above to determine new one or more calibration values. If at any time during normal operation, the monitored power varies from the power calibration value (e.g., varies from a 12.5% window around the power calibration value), the motor 145 will be powered down and the fault LED DS3 is lit.

In one construction, the automatic calibration instructions include not monitoring the power of the motor 145 during a start-up period, generally preset for a time duration (e.g., 2 seconds), upon the system power-up. In the case when the system 110 is operated for the first time, the system 110 enters the prime period, upon completion of the start-up period, and the power of the motor 145 is monitored to determine the power calibration value. As indicated above, the power calibration value is stored in the memory of the microcontroller 185a. After completion of the 3 minutes of the priming period, the system 110 enters the normal running period. In subsequent system power-ups, the monitored power is compared against the power calibration value stored in the memory of the microcontroller 185a memory during the priming period. More specifically, the system 110 enters the normal running period when the monitored power rises above the power calibration value during the priming period. In some cases, the monitored power does not rise above the power calibration value within the 3 minutes of the priming period. As a consequence, the motor 145 is powered down and a fault indicator is lit.

In other constructions, the priming period of the automatic calibration can include a longer preset time duration (for example, 4 minutes) or an adjustable time duration capability. Additionally, the controller 150*a* can include instructions to perform signal conditioning operations to the monitored power. For example, the controller 150*a* can include instructions to perform an IIR filter to condition the monitored power. In some cases, the IIR filter can be applied to the monitored power during the priming period and the normal operation period. In other cases, the IIR filter can be applied to the monitored power upon determining the power calibration value after the priming period.

The controller 150*a* measures motor input power, and not just motor power factor or input current. However, it is envisioned that the controller 150*a* can be modified to monitor other motor parameters (e.g., only motor current, only motor power factor, or motor speed). But motor input power is the preferred motor parameter for controller 150*a* for determining whether the water is impeded. Also, it is envisioned that the controller 150*a* can be modified to monitor other parameters (e.g., suction side pressure) of the system 110.

For some constructions of the controller 150*a*, the microcontroller 185*a* monitors the motor input power for an over power condition in addition to an under power condition. The monitoring of an over power condition helps reduce the chance that controller 150*a* was incorrectly calibrated, and/or also helps detect when the pump is over loaded (e.g., the pump is moving too much fluid).

The voltage sense and average circuit 165*a* generates a value representing the averaged power line voltage and the current sense and average circuit 170*a* generates a value representing the averaged motor current. Motor power factor is derived from the timing difference between the sign of the voltage signal and the sign of the current signal. This time difference is used to look up the motor power factor from a table stored in the microcontroller 185*a*. The averaged power line voltage, the averaged motor current, and the motor power factor are then used to calculate the motor input power using equation e1.

$$V_{avg} * I_{avg} * PF = \text{Motor\_Input\_Power} \quad [\text{e1}]$$

It is understood that for other types of motors (e.g., a vector-driven motor), the motor input power may be calculated differently. The calculated motor input power is then compared to the calibrated value to determine whether a fault has occurred. If a fault has occurred, the motor is powered down and the fault indicator is lit.

Redundancy is also used for the power switches of the controller 150*a*. Two relays K1 and K2 are used in series to do this function. This way, a failure of either component will still leave one switch to turn off the motor 145. As an additional safety feature, the proper operation of both relays is checked by the microcontroller 185*a* every time the motor 145 is powered-on via the relay voltage detector circuit 212*a*.

Another aspect of the controller 150*a* is that the microcontroller 185*a* provides pulses at a frequency greater than a set frequency (determined by the retriggerable pulse generator circuits) to close the relays K1 and K2. If the pulse generators U3A and U3B are not triggered at the proper frequency, the relays K1 and K2 open and the motor powers down.

As previously indicated, the microcontroller 185*a* can calculate an input power based on parameters such as averaged voltage, averaged current, and power factor. The microcontroller 185*a* then compares the calculated input power with the power calibration value to determine whether a fault condition (e.g., due to an obstruction) is present. Other constructions can include variations of the microcontroller 185*a* and the controller 150*a* operable to receive other parameters and determine whether a fault condition is present.

One aspect of the controller 150*a* is that the microcontroller 185*a* can monitor the change of input power over a predetermined period of time. More specifically, the microcontroller 185*a* determines and monitors a power derivative value equating about a change in input power divided by a change in time (i.e., the instantaneous change of input power with respect to time or a first-order mathematical derivative). In cases where the power derivative traverses a threshold value, the controller 150*a* controls the motor 145 to shut down the pump 140. This aspect of the controller 150*a* may be operable in replacement of, or in conjunction with, other similar aspects of the controller 150*a*, such as shutting down the motor 145 when the power level of the motor 145 traverses a predetermined value.

Figure 5:
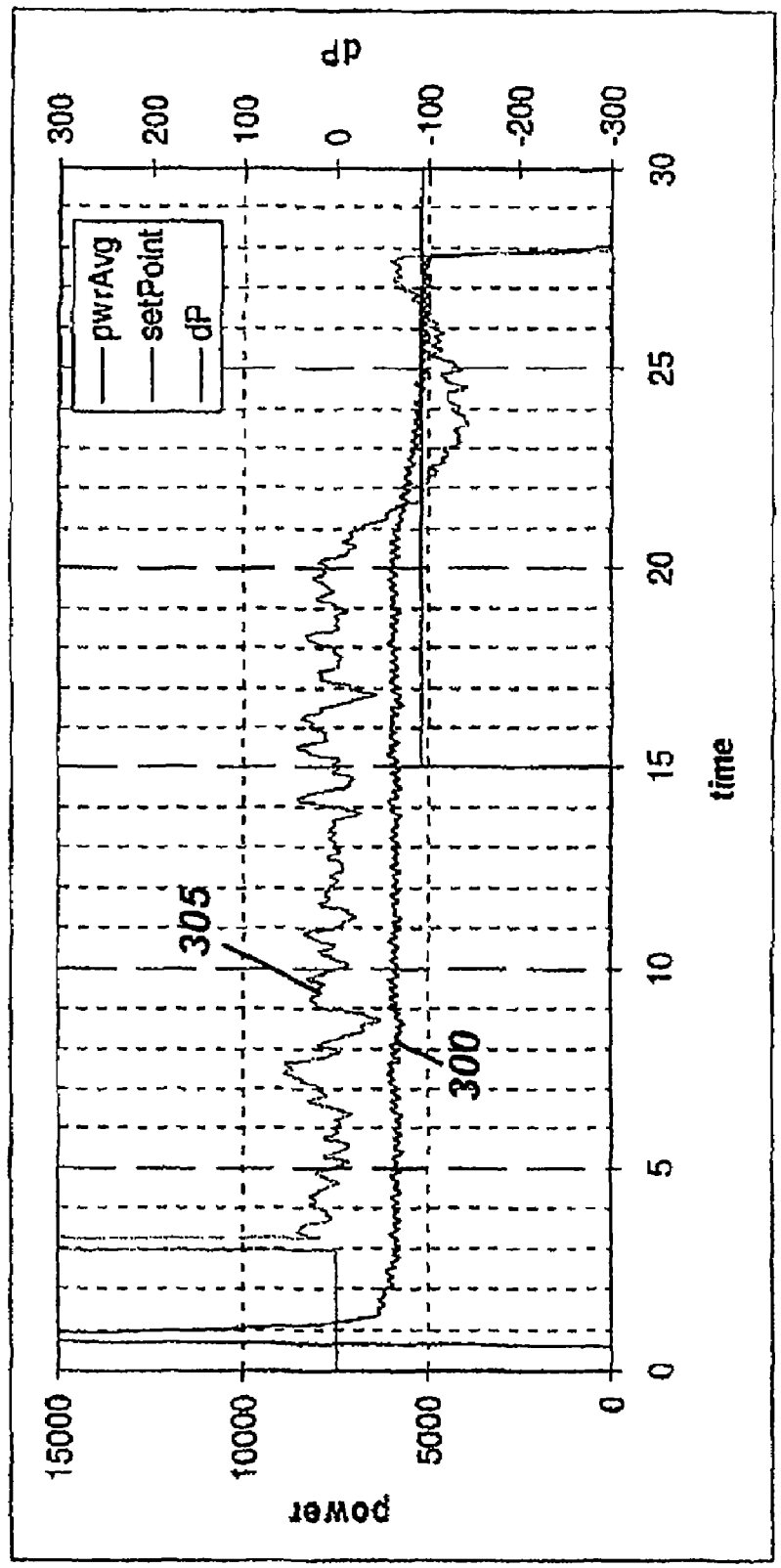
FIG. 5 is a graph showing an input power signal and a derivative power signal as a function of time.

For example, FIG. 5 shows a graph indicating input power and power derivative (i.e., the instantaneous change of input power with respect to time or a first-order mathematical derivative) as functions of time. More specifically, FIG. 5 shows a power reading (line 300) and a power derivate value (line 305), over a 30-second time period, of a motor 145 calibrated at a power threshold value of 5000 and a power derivative threshold of −100. In this particular example, a water blockage in the fluid-movement system 110 (shown in FIG. 1) occurs at the 20-second mark. It can be observed from FIG. 5 that the power reading 300 indicates a power level drop below the threshold value of 5000 at the 27-second mark, causing the controller 150*a* to shut down the pump 140 approximately at the 28-second mark. It can also be observed that the power derivative value 305 drops below the −100 threshold value at the 22-second mark, causing the controller 150*a* to shut down the pump 140 approximately at the 23-second mark. Other parameters of the motor 145 (e.g., torque) can be monitored by the microcontroller 185*a*, for determining a potential entrapment event.

Figure 6:
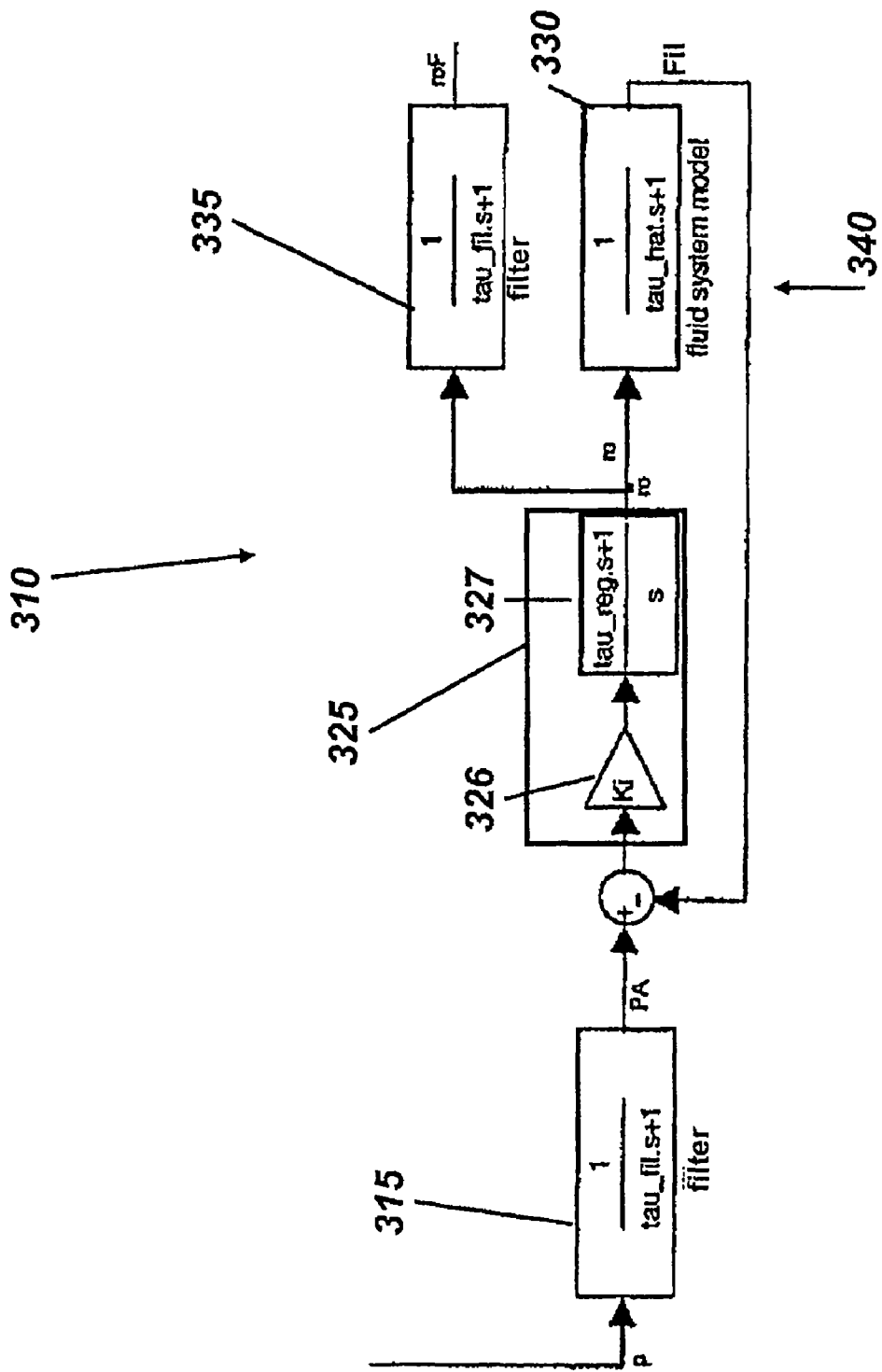
FIG. 6 is a flow diagram illustrating a model observer.

In another aspect of the controller 150*a*, the microcontroller 185*a* can include instructions that correspond to a model observer, such as the exemplary model observer 310 shown in FIG. 6. The model observer 310 includes a first filter 315, a regulator 325 having a variable gain 326 and a transfer function 327, a fluid system model 330 having a gain parameter (shown in FIG. 6 with the value of 1), and a second filter 335. In particular, the fluid system model 330 is configured to simulate the fluid-movement system 110. Additionally, the first filter 315 and the second filter 335 can include various types of analog and digital filters such as, but not limited to, low pass, high pass, band pass, anti-aliasing, IIR, and/or FIR filters.

It is to be understood that the model observer 310 is not limited to the elements described above. In other words, the model observer 310 may not necessarily include all the elements described above and/or may include other elements or combination of elements not explicitly described herein. In reference particularly to the fluid system model 330, a fluid system model may be defined utilizing various procedures. In some cases, a model may be generated for this particular aspect of the controller 150*a* from another model corresponding to a simulation of another system, which may not necessarily be a fluid system. In other cases, a model may be generated solely based on controls knowledge of closed loop or feed back systems and formulas for fluid flow and power. In yet other cases, a model may be generated by experimentation with a prototype of the fluid system to be modeled.

In reference to the model observer 310 of FIG. 6, the first filter 315 receives a signal (P) corresponding to a parameter of the motor 145 determined and monitored by the microcontroller 185a (e.g., input power, torque, current, power factor, etc.). Generally, the first filter 315 is configured to substantially eliminate the noise in the received signal (P), thus generating a filtered signal (PA). However, the first filter 315 may perform other functions such as anti-aliasing or filtering the received signal to a predetermined frequency range. The filtered signal (PA) enters a feed-back loop 340 of the model observer 310 and is processed by the regulator 325. The regulator 325 outputs a regulated signal (ro) related to the fluid flow and/or pressure through the fluid-movement system 110 based on the monitored parameter. The regulated signal can be interpreted as a modeled flow rate or modeled pressure. The fluid system model 330 processes the regulated signal (ro) to generate a model signal (Fil), which is compared to the filtered signal (PA) through the feed-back loop 340. The regulated signal (ro) is also fed to the second filter 335 generating a control signal (roP), which is subsequently used by the microcontroller 185a to at least control the operation of the motor 145.

As shown in FIG. 6, the regulated signal (ro), indicative of fluid flow and/or pressure, is related to the monitored parameter as shown in equation [e2].

$$ro = (PA - Fil) * \text{regulator} \qquad [e2]$$

The relationship shown in equation [e2] allows a user to control the motor 145 based on a direct relationship between the input power or torque and a parameter of the fluid flow, such as flow rate and pressure, without having to directly measure the fluid flow parameter.

Figure 7:
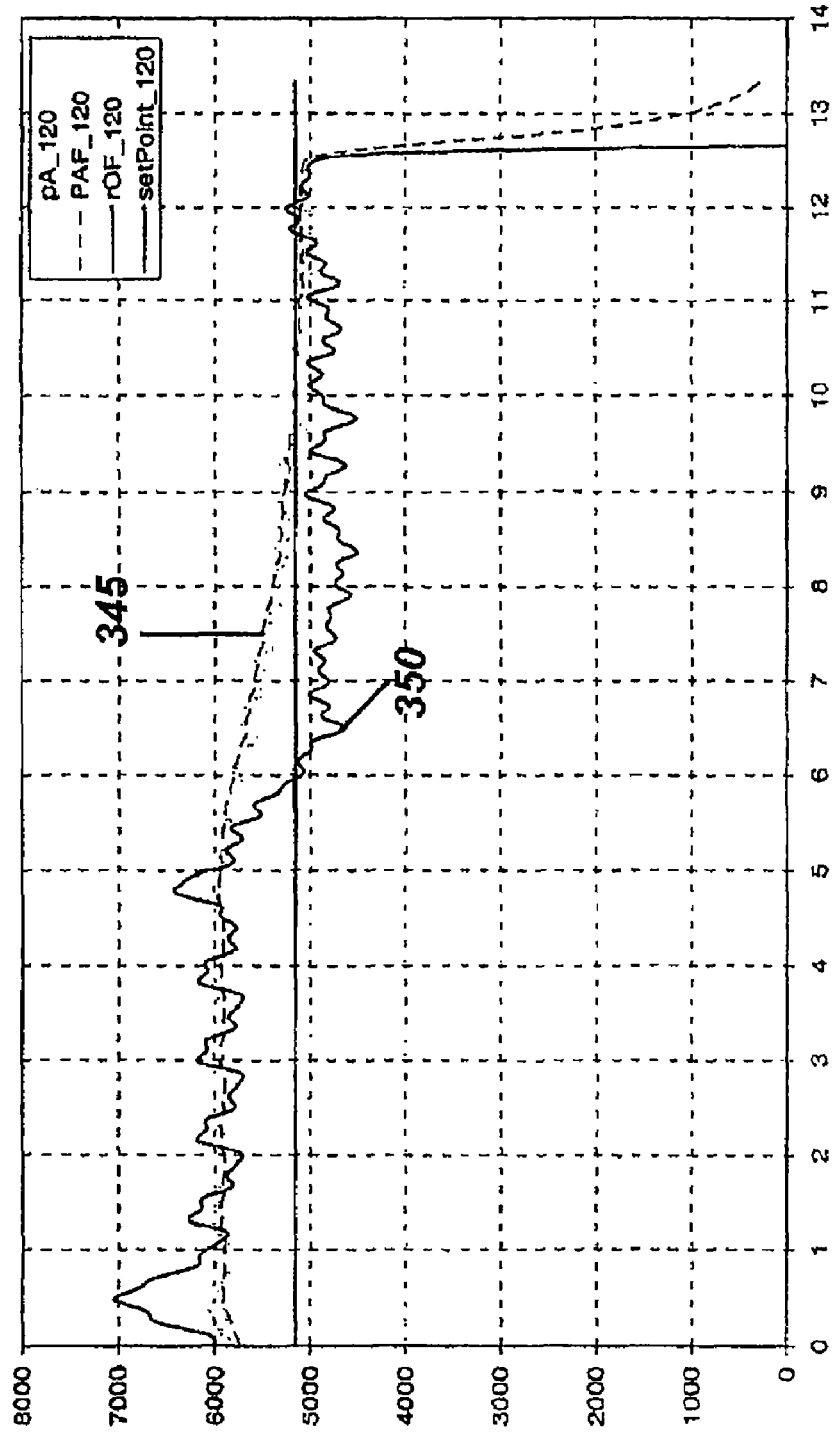
FIG. 7 is a graph showing an input power signal and a processed power signal as a function of time.

FIG. 7 is a graph showing an input power (line 345) and a processed power or flow unit (line 350) as functions of time. More specifically, the graph of FIG. 7 illustrates the operation of the fluid-movement system 110 with the motor 145 having a threshold value of 5000. For this particular example, FIG. 7 shows that the pump inlet 125 blocked at the 5-second mark. The input power drops below the threshold mark of 5000, and therefore the controller 150a shuts down the pump 140 approximately at the 12.5-second mark. Alternatively, the processed power signal drops below the threshold mark corresponding to 5000 at the 6-second mark, and therefore the controller 150a shuts down the pump 140 approximately at the 7-second mark.

In this particular example, the gain parameter of the fluid system model 330 is set to a value of 1, thereby measuring a unit of pressure with the same scale as the unit of power. In other examples, the user can set the gain parameter at a different value to at least control aspects of the operation of the motor 145, such as shut down time.

Figure 8:
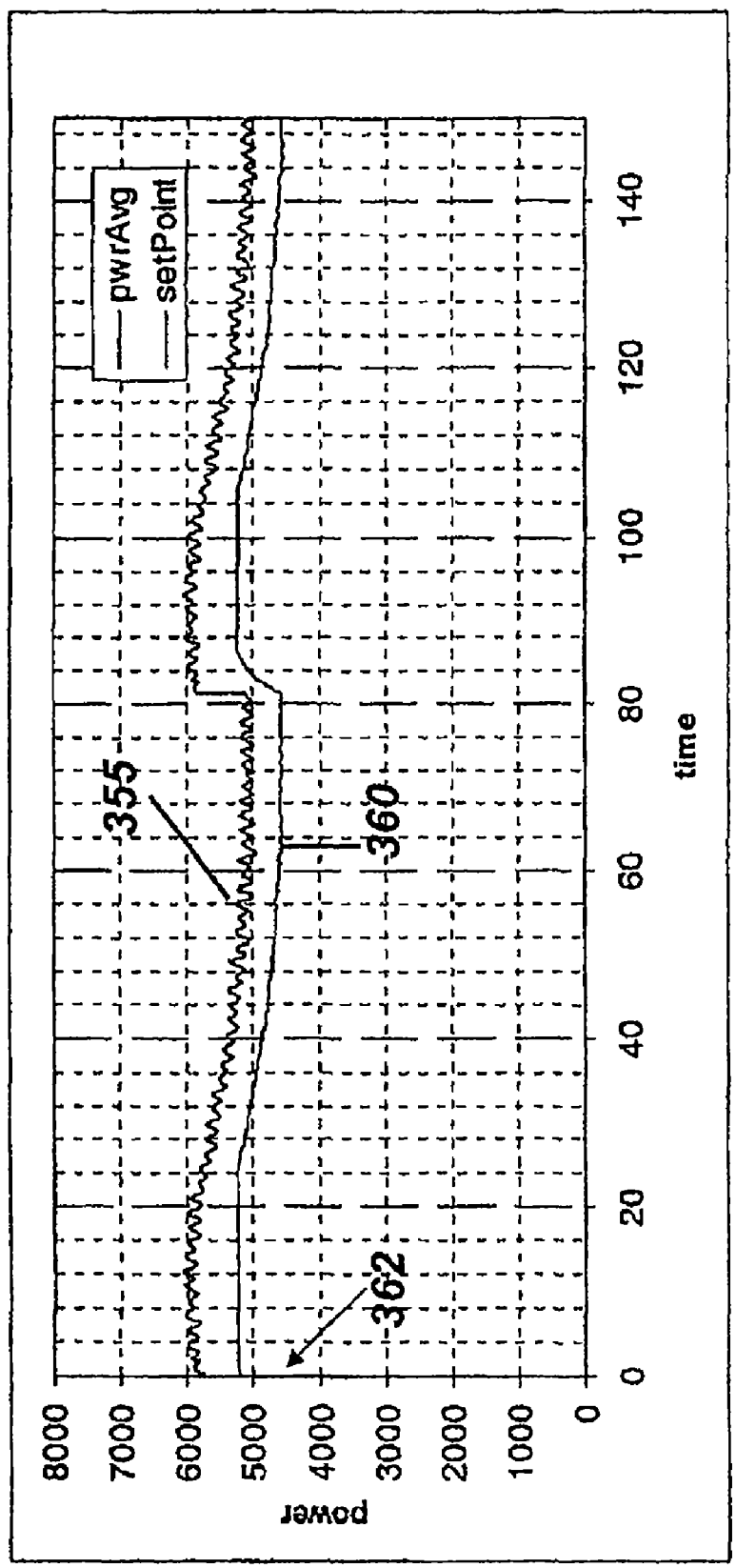
FIG. 8 is a graph showing an average input power signal and a threshold value reading as a function of time.

In another aspect of the controller 150a, the microcontroller 185a can be configured for determining a floating threshold value or trip value indicating the parameter reading, such as input power or torque, at which the controller 150a shuts down the pump 140. It is to be understood that the term "floating" refers to varying or adjusting a signal or value. In one example, the microcontroller 185a continuously adjusts the trip value based on average input power readings, as shown in FIG. 8. More specifically, FIG. 8 shows a graph indicating an average input power signal (line 355) determined and monitored by the microcontroller 185a, a trip signal (line 360) indicating a variable trip value, and a threshold value of about 4500 (shown in FIG. 8 with arrow 362) as a function of time. In this particular case, the threshold value 362 is a parameter indicating the minimum value that the trip value can be adjusted to.

The microcontroller 185a may calculate the average input power 355 utilizing various methods. In one construction, the microcontroller 185a may determine a running average based at least on signals generated by the current sense and average circuit 170a and signals generated by the voltage sense and average circuit 165a. In another construction, the microcontroller 185a may determine an input power average over relatively short periods of time. As shown in FIG. 8, the average power determined by the microcontroller 185a goes down from about 6000 to about 5000 in a substantially progressive manner over a time period of 80 units of time. It can also be observed that the signal 360 indicating the trip value is adjusted down to about 10% from the value at the O-time unit mark to the 80-time unit mark and is substantially parallel to the average power 355. More specifically, the microcontroller 185a adjusts the trip value based on monitoring the average input power 355.

In some cases, the average power signal 355 may define a behavior, such as the one shown in FIG. 8, due to sustained clogging of the fluid-movement system 110 over a period of time, for example from the 0-time unit mark to the 80-time unit mark. In other words, sustained clogging of the fluid-movement system 110 can be determined and monitored by the microcontroller 185a in the form of the average power signal 355. In these cases, the microcontroller 185a can also determine a percentage or value indicative of a minimum average input power allowed to be supplied to the motor 145, or a minimum allowed threshold value such as threshold value 362. When the fluid-movement system 110 is back-flushed with the purpose of unclogging the fluid-movement system 110, the average power signal 355 returns to normal unrestricted fluid flow (shown in FIG. 8 between about the 84-time unit mark and about the 92-time unit mark, for example). As shown in FIG. 8, unclogging the fluid-movement system 110 can result in relative desired fluid flow through the fluid-movement system 110. As a consequence, the microcontroller 185a senses an average power change as indicated near the 80-time unit mark in FIG. 8 showing as the average power returns to the calibration value.

In some circumstances, a pool or spa (or other fluid pumping system) may be constructed in such a way that other electrical equipment impacts the voltage supplied to the controller 150a and the pump motor 145 from the AC power source 155. For example, a vacuum system, when powered up, may result in a temporary drop in the voltage supplied by the AC power source to the controller 150a and the pump motor 145. During this drop in supply voltage, the pump motor 145 continues to drive the pump. As a result, the power drawn by the pump motor 145 drops in proportion to the drop in supply voltage (i.e., P=IV). If this drop in power is significant enough, the controller 150a can falsely determine that a possible suction and/or mechanical entrapment (or blockage/reduced flow) event has occurred, and can turn off the pump motor 145, in some cases requiring a manual restarting of the pump motor 145.

Figure 9:
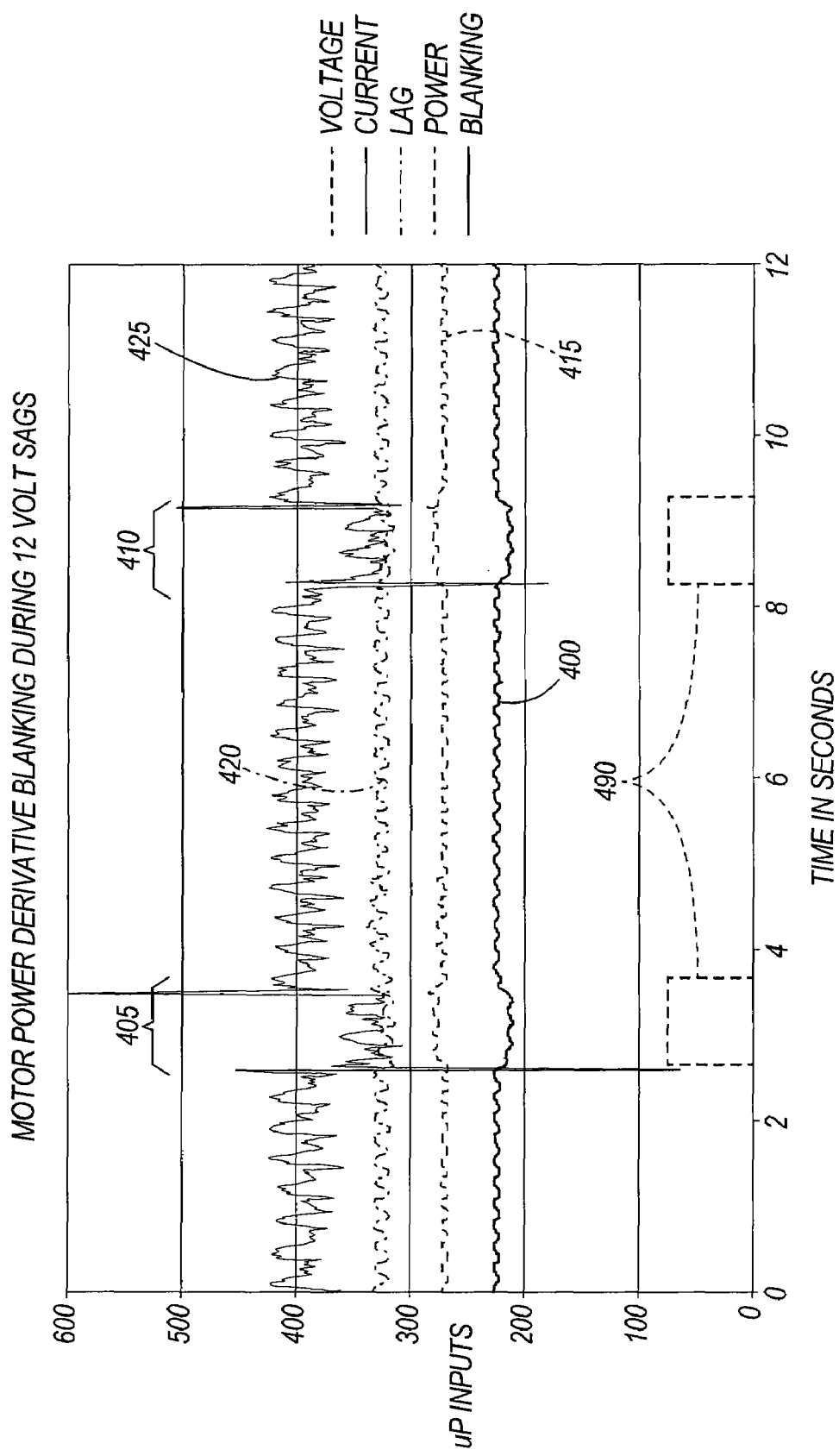
FIG. 9 is a graph showing a drop in input power and the resulting changes in current, power, and power factor.

FIG. 9 is a chart depicting the various signals monitored by the controller 150a, and shows the impact of a drop in supply voltage. The supply voltage is shown at 400 depicting normal fluctuations in voltage levels except during time periods 405 and 410 (between approximately 2.75 sec. and 3.75 sec. and between approximately 8.25 sec. and 9.25 sec.). During time periods 405 and 410, the supply moves downward, then maintains a reduced level for a short period before returning to normal levels. The current 415 and power 420 drawn by the pump motor 145 are shown along with a power factor 425 of the motor 145. As is shown on the graph, the power factor 425 changes substantially during the time periods 405 and 410.

The current 415 increases slightly, and the power 420 drawn decreases slightly during the time periods 405 and 410 when the supply voltage is below normal. It is during the voltage transitions of these time periods 405 and 410 when the controller 150a may falsely detect a possible suction and/or mechanical entrapment event.

Figure 10:
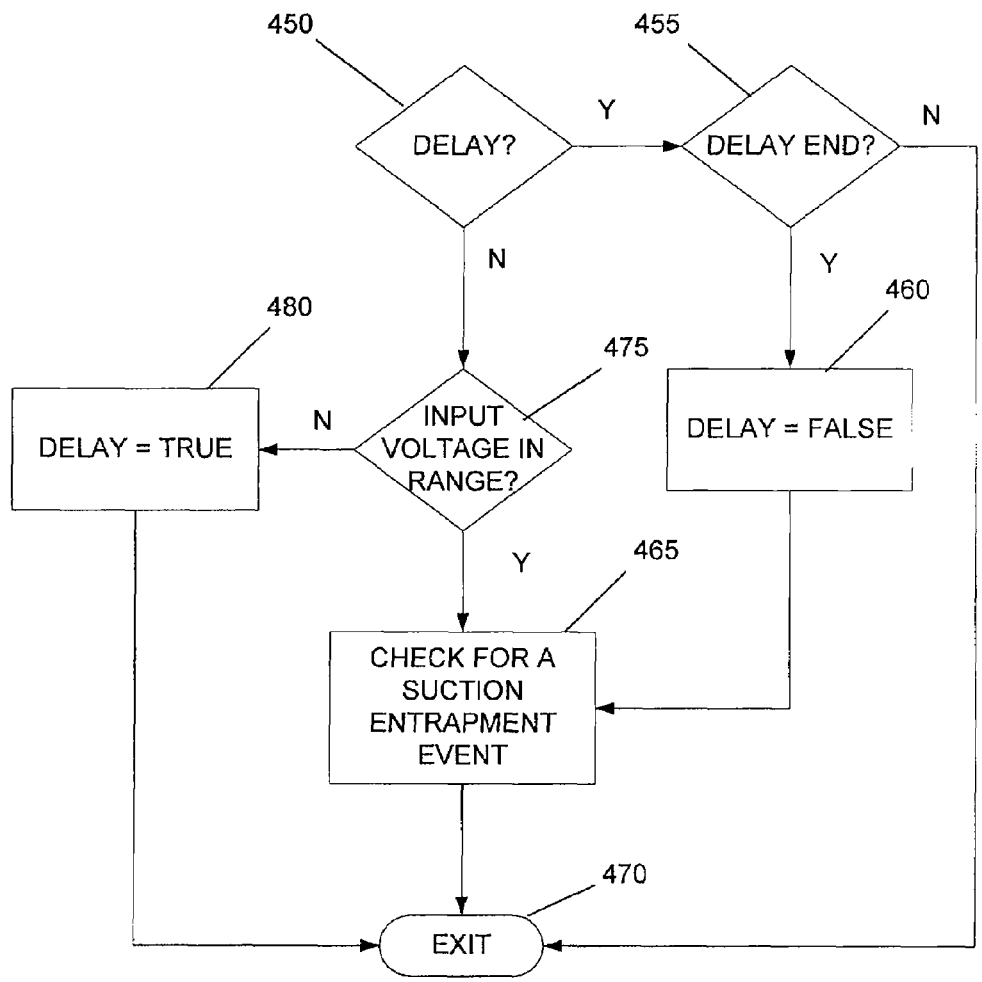
FIG. 10 is a flow chart of an embodiment of the operation of a controller for avoiding a false detection of a possible suction entrapment event according to the invention.

FIG. 10 represents a flow chart of an embodiment of the operation of the controller for reducing the possibility of detecting a false suction and/or mechanical entrapment event by not checking for a possible event for a period of time following detection of a change in supply voltage exceeding a threshold. The operation shown in FIG. 10 can be executed on a continuous basis or can be executed at timed intervals (e.g., every 10 msec). The controller begins by checking whether a delay event has been triggered (step 450) as will be discussed below. If a delay event was triggered previously (i.e., Delay=True), the controller determines if the predetermined time period for the delay (e.g., one second) has been exhausted (step 455). If the time period for the delay has been exhausted, the controller sets the delay to false (step 460), determines if there is a possible entrapment event as has been previously disclosed (step 465), and exits (step 470). If, at step 455, the time period for the delay has not been exhausted, the controller exits the routine (step 470) without checking for a possible entrapment event.

If, at step 450, a delay was not in progress, the controller continues by determining if the voltage supplied to the pump motor was within an acceptable range (step 475) as is discussed in more detail below. If the change in supply voltage is not within an acceptable range, the delay is triggered (step 480) to reduce the possibility of a false entrapment event detection. If the change in supply voltage is within the acceptable range, the controller continues with determining if a possible entrapment event has occurred (step 465). Referring back to FIG. 9, the delay is depicted as blanking times 490 on the chart. During the blanking times 490, detection of possible entrapment events is suspended, allowing the power 420 and power factor 425 readings to return to normal, assuming there is not an entrapment event occurring, and the supply voltage 400 returns to normal.

Figure 11:
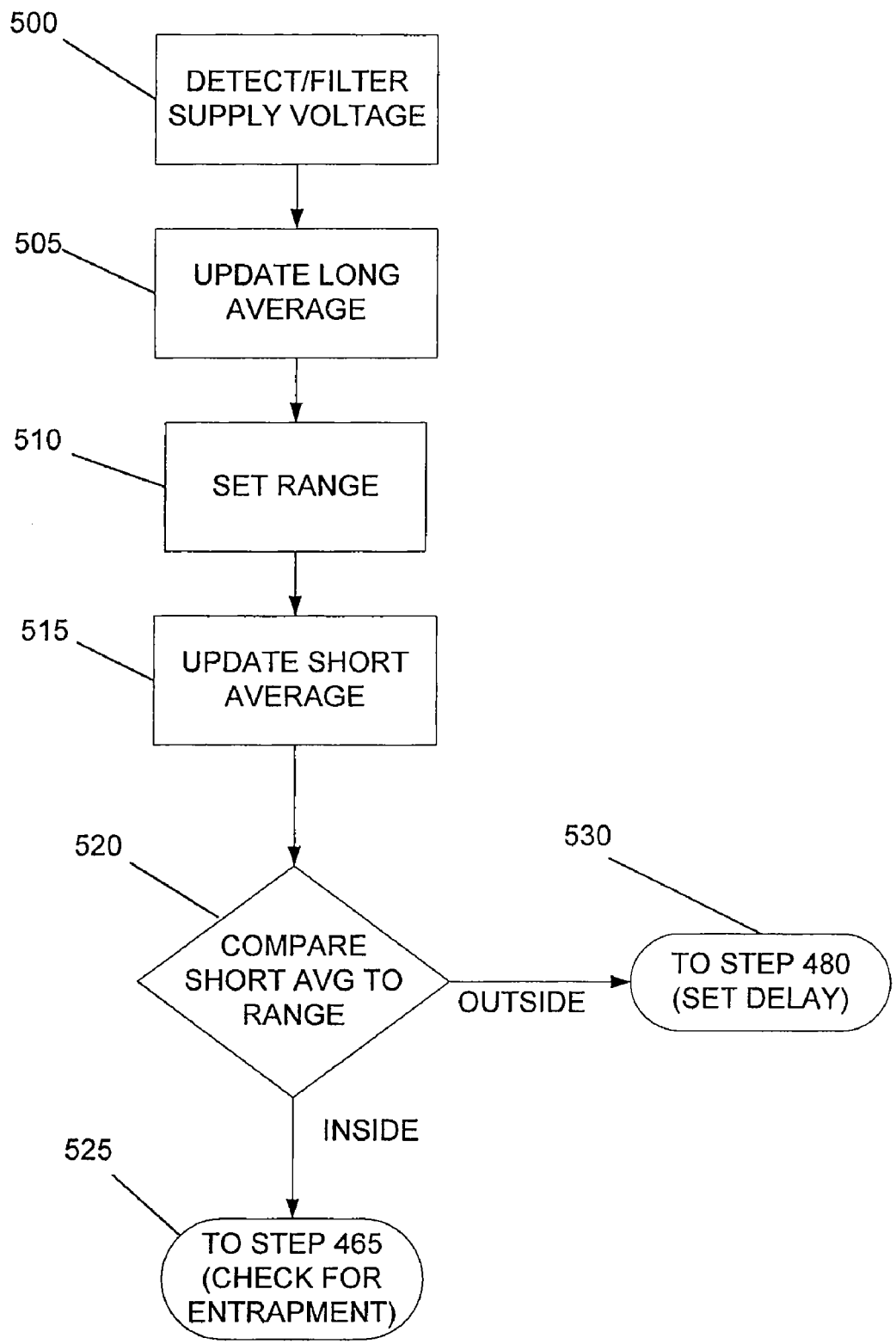
FIG. 11 is a flow chart of an embodiment of the operation of a controller for determining if a supply voltage is within an acceptable range according to the invention.

FIG. 11 represents a flow chart of an embodiment of the operation of the controller for determining if the supply voltage is within an acceptable range (i.e., step 475 of FIG. 10). The controller begins by detecting the supply voltage (step 500), as discussed above. Next the controller updates (recalculates) a long average for the supply voltage (step 505). The long average is a running average of the supply voltage over a relatively long period of time (e.g., 1 to 60 seconds). The level of the supply voltage (e.g., 115 Vac or 230 Vac) and the speed of the pump motor (e.g., high speed or low speed) are used to determine an acceptable threshold for fluctuation of the supply voltage around the long average. A range is determined based on the long average plus or minus the acceptable threshold (step 510).

The controller also updates a short average for the supply voltage (step 515). The short average is a running average of the supply voltage for a relatively short period of time (e.g., 4-20 cycles—67 msec to 333 msec at 60 Hz.), and serves to filter out spikes in the supply voltage such that a spike does not trigger a delay (as described above with regard to FIG. 10) and slow down the detection of a possible entrapment event. Next the updated short average supply voltage is compared to the range determined in step 510 (step 520). If the short average supply voltage is within the acceptable range, the controller continues with checking for a possible entrapment event in step 465 of FIG. 10 (step 525). If the short average supply voltage is not within the acceptable range, the controller continues by implementing a delay in step 480 of FIG. 10 (step 530), the delay allows a temporary rise or drop in supply voltage due to, for example, another electrical device starting up, to not cause a false detection of a possible entrapment event.

In some embodiments, the short average supply voltage is subtracted from the long average supply voltage, and an absolute value of the difference is compared to a threshold. If the absolute value of the difference exceeds the threshold, the controller implements the delay to allow a temporary rise or drop in supply voltage due to, for example, another electrical device starting up, to not cause a false detection of a possible entrapment event. In other embodiments, there can be two different thresholds, one for an increase in supply voltage and one for a decrease in supply voltage.

In some embodiments, detecting a change in power factor exceeding a threshold is used to reduce the possibility of detecting a false suction and/or mechanical entrapment event. As discussed above with respect to supply voltage, a controller does not check for a possible entrapment event for a period of time following detection of a change in power factor exceeding the threshold.

While the above constructions and embodiments have been described in relation to pump systems, the systems and methods described (including the use of running averages) have application in other systems that detect fault conditions in motors based on changes in electrical characteristics, for example, blowers, electric vehicles, etc. In addition to the methods of reducing false detection of faults by suspending fault checking for predetermined time periods (i.e., generating blanking times), other methods are also contemplated including different methods of initiating blanking times and different methods of setting the duration of blanking times. In some embodiments, faults can still be detected during blanking times. In such embodiments, thresholds may be modified during the blanking times (e.g., a valid range can be expanded, a threshold increased, a threshold decreased, etc.) and/or factors other than or in addition to electrical characteristics can be used to determine faults.

The constructions described above and illustrated in the figures are presented by way of example only and are not intended as a limitation upon the concepts and principles of the invention.

What is claimed is:

1. A pump system coupled to a power source, comprising:
    a pump;
    a motor coupled to the pump, the motor operating the pump;
    a sensor coupled to the power source, the sensor detecting an electrical characteristic of the power source; and
    a controller coupled to the sensor and the motor, the controller
        executing a fault check,
        controlling the motor,
        generating a running average of the sensed electrical characteristic,
        detecting a change in the sensed electrical characteristic using the generated running average, and
        suspending the executing of the fault check when the detected change in the electrical characteristic is outside of a valid characteristic range.

2. The pump system of claim 1, wherein generating the running average comprises generating a first running average of the electrical characteristic for a first length of time and a second running average of the electrical characteristic for a second length of time, the first length of time substantially longer than the second length of time.

3. The pump system of claim 1, wherein the valid characteristic range is between the first running average minus a first constant and the first running average plus a second constant.

4. The pump system of claim 1, wherein the electrical characteristic is voltage.

5. The pump system of claim 1, wherein the electrical characteristic is a power factor.

6. The pump system of claim 1, wherein executing the fault check includes generating a derivative based on the sensed electrical characteristic.

7. The pump system of claim 6, wherein the fault check includes monitoring the derivative, and determining whether the derivative indicates an undesired flow of fluid through the pump.

8. The pump system of claim 7, wherein the controller stops the motor when the derivative indicates the undesired flow of fluid through the pump.

9. The pump system of claim 1, wherein the executing of the fault check is suspended for a predetermined period of time.

10. The pump system of claim 1, wherein the executing of the fault check is suspended until the detected change in the electrical characteristic is within the valid characteristic range.

11. The pump system of claim 1, wherein the electrical characteristic is voltage.

12. The pump system of claim 1, wherein the electrical characteristic is a power factor.

13. The pump system of claim 1, wherein the executing of the fault check is suspended for a predetermined period of time.

14. The pump system of claim 1, wherein the executing of the fault check is suspended until the detected change in the electrical characteristic is within the valid characteristic range.

15. A method of operating a pump system including a pump, a motor, a sensor, and a controller, the method comprising:
operating the motor;
executing a fault check;
determining an electrical characteristic related to a power supplied by a power source coupled to the motor;
generating a running average of the sensed electrical characteristic,
determining that the electrical characteristic is outside of a valid characteristic range, wherein the determination is based on the generated running average; and
suspending execution of the fault check for a predetermined period of time after determining the electrical characteristic is outside the valid characteristic range.

16. The method of claim 15, wherein generating the running average comprises generating a first running average of the electrical characteristic and a second running average of the electrical characteristic.

17. The method of claim 16, wherein the first running average is generated for a first length of time, and the second running average is generated for a second length of time, the first length of time substantially longer than the second length of time.

18. The method of claim 16, wherein the valid characteristic range is between the first running average minus a first constant and the first running average plus a second constant.

19. The method of claim 15, wherein the electrical characteristic is voltage.

20. The method of claim 15, wherein executing the fault check includes generating a derivative based on the sensed electrical characteristic.

21. The method of claim 20, wherein the fault check includes monitoring the derivative, and determining whether the derivative indicates an undesired flow of fluid through the pump.

22. The method of claim 21, wherein the controller stops the motor when the derivative indicates the undesired flow of fluid through the pump.

23. A controller for a motor, comprising:
a memory;
a sensor configured to sense an electrical characteristic of the motor; and
a processor coupled to the memory and the sensor, the processor
executing a fault check,
controlling the motor,
generating a running average of the sensed electrical characteristic,
detecting a change in the sensed electrical characteristic using the generated running average, and
suspending the executing of the fault check when the detected change in the sensed electrical characteristic is outside of a valid characteristic range.

24. The controller of claim 23, wherein the executing of the fault check is suspended for a predetermined period of time.

25. The controller of claim 23, wherein the processor generates the running average by generating a first running average of the electrical characteristic for a first length of time and a second running average of the electrical characteristic for a second length of time, the first length of time substantially longer than the second length of time.

26. The controller of claim 23, wherein the valid characteristic range is between the first running average minus a first constant and the first running average plus a second constant.

27. The controller of claim 23, wherein the electrical characteristic is voltage.

28. A pump system coupled to a power source, comprising:
a pump;
a motor coupled to the pump, the motor operating the pump;
a sensor coupled to the power source, the sensor detecting an electrical characteristic of the power source; and
a controller coupled to the sensor and the motor, the controller
executing a fault check, wherein executing the fault check includes generating a derivative based on the sensed electrical characteristic,
controlling the motor,
detecting a change in the sensed electrical characteristic, and
suspending the executing of the fault check when the detected change in the electrical characteristic is outside of a valid characteristic range.

29. The pump system of claim 28, wherein the fault check includes monitoring the derivative, and determining whether the derivative indicates an undesired flow of fluid through the pump.

30. The pump system of claim 29, wherein the controller stops the motor when the derivative indicates the undesired flow of fluid through the pump.

* * * * *